US008456681B2

(12) United States Patent
Suzuki

(10) Patent No.: US 8,456,681 B2
(45) Date of Patent: Jun. 4, 2013

(54) IMAGE PROCESSING APPARATUS, IMAGE FORMING APPARATUS, AND STORAGE MEDIUM STORING PROGRAM

(75) Inventor: Tadashi Suzuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 241 days.

(21) Appl. No.: 12/885,923

(22) Filed: Sep. 20, 2010

(65) Prior Publication Data

US 2011/0235062 A1    Sep. 29, 2011

(30) Foreign Application Priority Data

Mar. 23, 2010  (JP) ................................. 2010-066843

(51) Int. Cl.
  *G06F 3/12*  (2006.01)
(52) U.S. Cl.
  USPC ........... 358/1.15; 358/1.9; 358/3.01; 358/2.1; 358/518; 358/504; 347/54; 347/9; 347/40; 347/19; 347/103
(58) Field of Classification Search
  USPC ................. 358/1.15, 1.9, 3.01, 2.1, 504, 518, 358/521; 347/54, 9, 40, 19, 103, 102
  See application file for complete search history.

(56) References Cited

U.S. PATENT DOCUMENTS

| 2006/0061614 A1* | 3/2006 | Kodama et al. .................. 347/19 |
| 2007/0146462 A1* | 6/2007 | Taniuchi et al. .............. 347/103 |
| 2009/0097046 A1* | 4/2009 | Ohta et al. ...................... 358/1.9 |
| 2009/0201522 A1* | 8/2009 | Iguchi ............................ 358/1.9 |

FOREIGN PATENT DOCUMENTS

| JP | A-2006-88425  | 4/2006 |
| JP | A-2006-262384 | 9/2006 |

* cited by examiner

*Primary Examiner* — Benny Q Tieu
*Assistant Examiner* — Martin Mushambo
(74) *Attorney, Agent, or Firm* — Oliff & Berridge, PLC

(57) ABSTRACT

An image processing apparatus is provided. A density conversion component converts a density of a transparent color material so that a total amount of a plurality of color materials is smaller than a predetermined first amount when it is determined that the total amount of the plurality of color materials is larger than the predetermined first amount and when the transparent color material is included in the plurality of color materials. A density ratio calculation component calculates a ratio between a density before converting the density of the transparent color material and a density after converting the density of the transparent material. A reporting component reports that the ratio of the density is smaller than a predetermined second amount when determining that the ratio of the density is smaller than the predetermined second amount.

7 Claims, 12 Drawing Sheets

IMAGE PROCESSING APPARATUS, IMAGE FORMING APPARATUS, AND STORAGE MEDIUM STORING PROGRAM

CROSS-REFERENCE TO RELATED APPLICATION

This application is based on and claims priority under 35 USC 119 from Japanese Patent Application No. 2010-066843 filed Mar. 23, 2010.

BACKGROUND

1. Technical Field

The invention relates to an image processing apparatus, an image forming apparatus, and a program.

2. Related Art

There exist an image processing apparatus for making a notification based on the amount of ink which is estimated from image data and an image processing method for producing a warning image with respect to an image to be warned.

SUMMARY

According to an aspect of the present invention, an image processing apparatus is provided. The image processing apparatus includes: a color material total amount determination component that determines whether or not a total amount of a plurality of color materials is larger than a predetermined first amount when an image is formed using the plurality of color materials; a density conversion component that converts a density of a transparent color material so that the total amount of the plurality of color materials is smaller than the predetermined first amount when it is determined that the total amount of the plurality of color materials is larger than the predetermined first amount and when the transparent color material is included in the plurality of color materials; a density ratio calculation component that calculates a ratio between a density before the density conversion component converts the density of the transparent color material and a density after the density conversion component converts the density of the transparent material; a density ratio determination component that determines whether or not the ratio of the density calculated by the density ratio calculating component is smaller than a predetermined second amount; and a reporting component that reports that the ratio of the density is smaller than the predetermined second amount when the density ratio determination component determines that the ratio of the density calculated by the density ratio calculating component is smaller than the predetermined second amount.

BRIEF DESCRIPTION OF THE DRAWINGS

An exemplary embodiment of the invention will be described in detail based on the following figures, wherein.

DETAILED DESCRIPTION

A detailed description will be given below of a preferred exemplary embodiment according to the invention with reference to the attached drawings.

Figure 1:
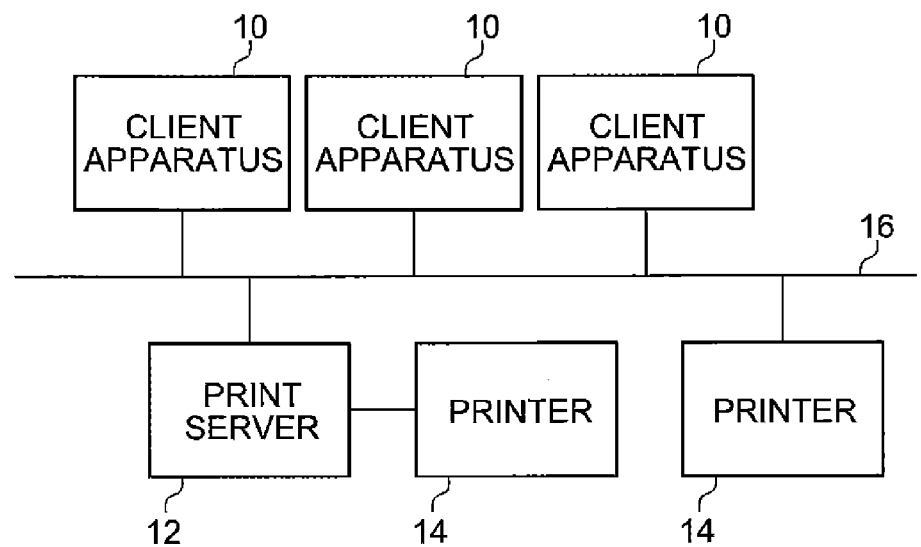
FIG. 1 is a block diagram illustrating an example of connection among a print server, printers, and client apparatuses.

As illustrated in FIG. 1, plural client apparatuses 10 and a print server 12 are connected to each other via a communication component 16 in the present exemplary embodiment. The communication component 16 may be a public network, the INTernet, or a network such as a LAN (abbreviating a Local Area Network) or a WAN (abbreviating a Wide Area Network). Moreover, the communication component 16 may be a radio communication component or a cable communication component. To the print server 12 are connected printers 14 not via or via the communication component 16.

The client apparatus 10 produces image formation information for allowing the printer 14 to form an image so as to transmit the image formation information to the print server 12. The image formation information is described in a page description language, and includes image information representing a colorful image.

The print server 12 analyzes the image formation information received from the client apparatus 10, and then, produces, per toner, image data (hereinafter referred to as raster data) on a density per pixel corresponding to the amount of an image forming material (hereinafter referred to as a toner) for use in forming an image in the printer 14 based on the image formation information (i.e., RIP, or raster image processing), so as to output the image data to the printer 14.

The printer 14 is adapted to form an image with a toner based on the raster data output from the print server 12.

In the present exemplary embodiment, the printer 14 forms a colorful image by using a Y (yellow) toner, an M (magenta) toner, a C (cyan) toner, and a K (black) toner. Here, these color toners are generically referred to as a colorful toner. As described later, the printer 14 is configured so as to form a transparent image in superimposition on a colorful image with a toner for forming the transparent image. Hereinafter, the toner for forming such a transparent image is referred to as a clear toner, and further, raster data for use in forming the image with the clear toner is referred to as clear raster data. Incidentally, the toner is simply referred to in the case where a description will be given without distinguishing the colorful toner from the clear toner.

Figure 2:
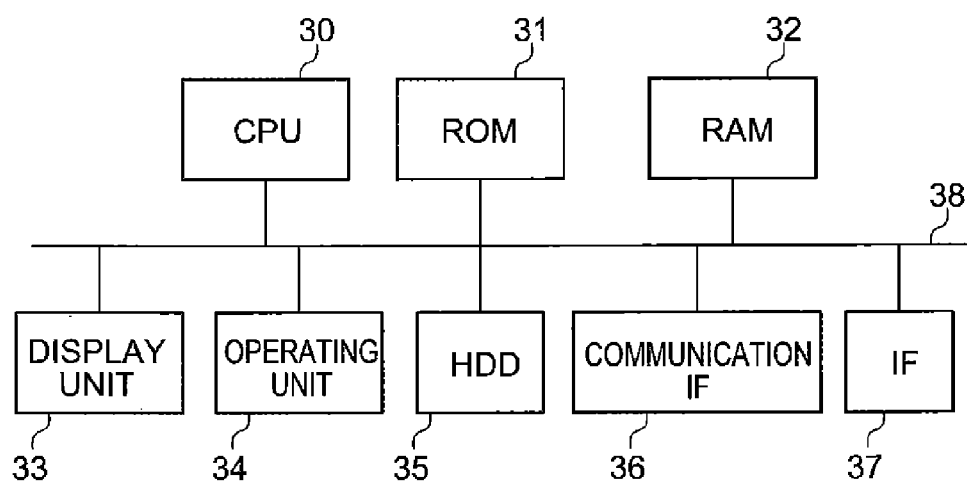
FIG. 2 is a block diagram illustrating one example of the configuration of the print server.

FIG. 2 is a block diagram illustrating one example of the configuration of the print server 12.

In the print server 12 in the present exemplary embodiment, a CPU (abbreviating a Central Processing Unit) 30, a ROM (abbreviating a Read Only Memory) 31, a RAM (abbreviating a Random Access Memory) 32, a display unit 33, an operating unit 34, an HDD (abbreviating a Hard Disk Drive) 35, a communication IF (abbreviating Interface) 36, and an IF (abbreviating an Interface) 37 are connected to each other via a bus 38.

The CPU 30 is adapted to execute a program stored in the ROM 31 or the HDD 35, to control the entire operation of the print server 12. In the ROM 31 are stored the program to be executed by the CPU 30, data required for the processing of the CPU 30, and the like. The RAM 32 is used as a work memory. Moreover, the RAM 32 includes also a region serving as an image memory for storing therein the raster data which is produced by the RIP.

The HDD 35 stores therein the program to be executed by the CPU 30 and various kinds of data. Moreover, the HDD 35 previously stores therein first and second total amount restriction values, described later.

Incidentally, a storage medium for storing therein the program to be executed by the CPU 30 is not limited to the HDD 35 or the ROM 31. For example, a flexible disk, a DVD disk, a magneto-optical disk, a USB memory (i.e., a universal serial bus memory), or the like may be used, or a storage device for another apparatus connected to the communication component 16 may be used.

The display unit 33 is constituted of, for example, a liquid crystal display or the like, and the display unit 33 displays various kinds of images, a message, or the like under control of the CPU 30. The operating unit 34 is constituted of, for example, a keyboard, a mouse, and the like. Various kinds of pieces of information are designated by operating the operating unit 34 by a user.

The communication IF 36 is an interface for transmitting/receiving data to/from another apparatus via the communication component 16.

The IF 37 is an interface for connecting the print server 12 to the printer 14.

The above-described client apparatus 10 has the same configuration as that of the print server 12. Here, programs to be executed by the CPU in the client apparatus 10 include various kinds of application software programs and programs for producing and transmitting the above-described image formation information.

Figure 3:
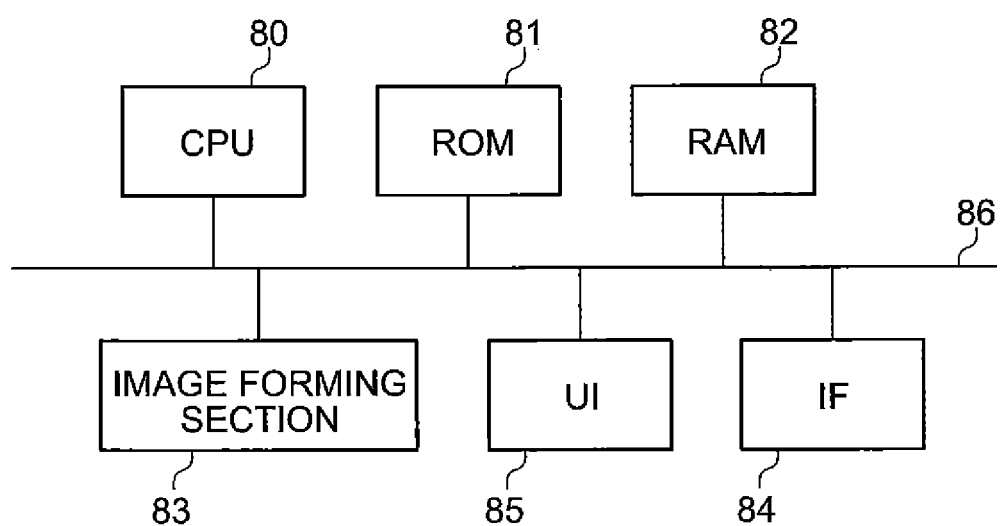
FIG. 3 is a block diagram illustrating one example of the configuration of the printer.

FIG. 3 is a block diagram illustrating one example of the configuration of the printer 14. Here, a description will be given of one example of the configuration of the printer 14 connected to the print server 12 not via the communication component 16.

In the printer 14, a CPU (abbreviating a Central Processing Unit) 80, a ROM (abbreviating a Read Only Memory) 81, a RAM (abbreviating a Random Access Memory) 82, an image forming section 83, an IF (abbreviating an Interface) 84, and a UI (abbreviating a User Interface) 85 are connected to each other via a bus 86.

The CPU 80 executes programs stored in the ROM 81 (including, for example, a program for achieving reception of the raster data from the print server 12 and control of the image forming section 83 so as to form an image based on the received raster data), thereby controlling the operation of the printer 14 as a whole. The ROM 81 stores therein programs to be executed by the CPU 80 and data required for the processing by the CPU 80, and the like. The RAM 82 is used as a work memory.

A storage medium for storing therein the programs to be executed by the CPU 80 is not limited to the ROM 81. For example, a flexible disk, a DVD disk, a magneto-optical disk, a USB memory, or the like may be used.

The image forming section 83 is adapted to form an image based on the raster data received from the print server 12. The configuration of the image forming section 83 will be described later.

The IF 84 is an interface for connecting the printer 14 to the print server 12.

The UI 85 is constituted of, for example, a touch panel display including a touch panel placed on a display, an operating button, and the like. On the UI 85 are displayed various kinds of pieces of information. Furthermore, various pieces of information or setting are input into the UI 85 by operation by a user.

Here, the printer 14 connected directly to the communication component 16 is provided with a communication IF for connecting the printer 14 to the communication component 16 in addition to the above-described configuration.

Figure 4:
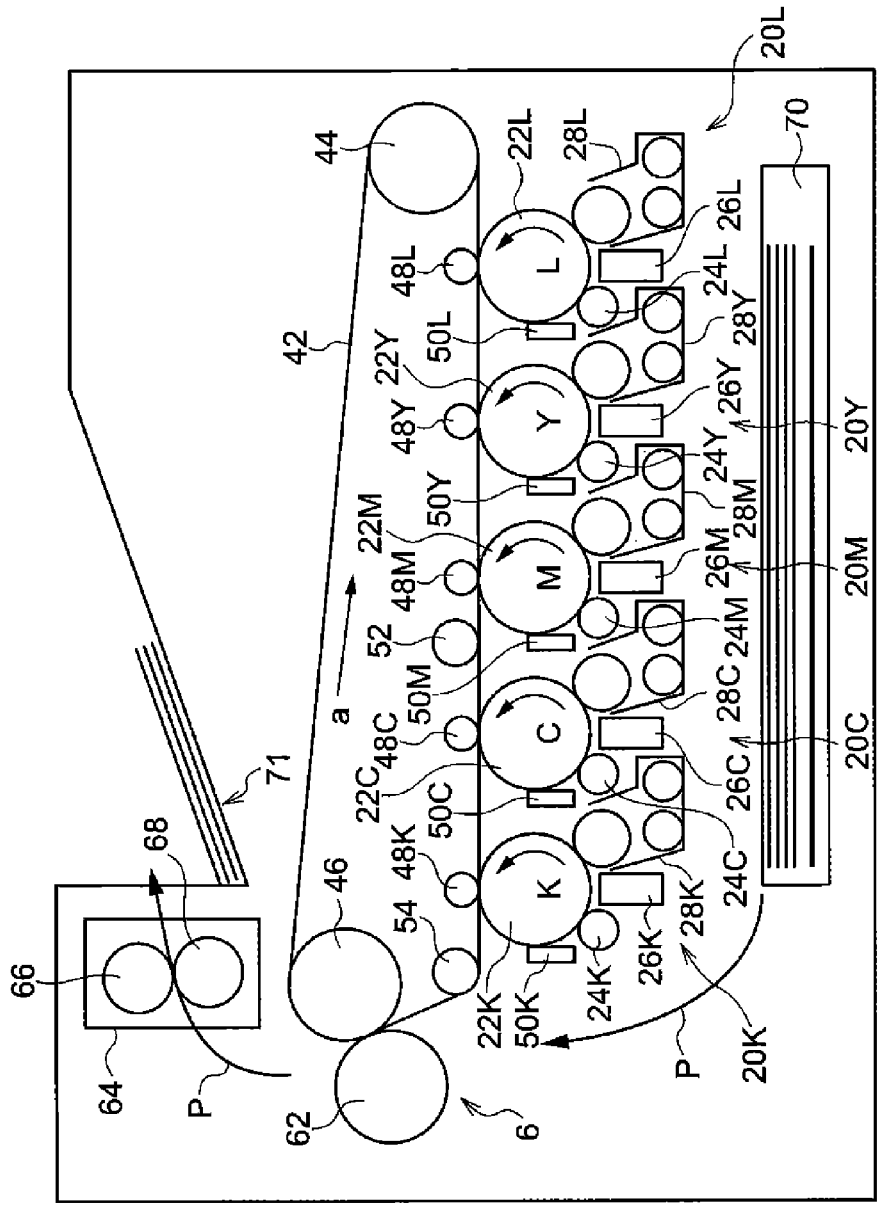
FIG. 4 is a view schematically showing the configuration of an image forming section.

FIG. 4 is a view schematically showing the configuration of the image forming section 83.

The image forming section 83 includes an intermediate transfer belt 42 which is rotated in a direction indicated by an arrow a in FIG. 4. Moreover, an L image forming unit 20L that forms a transparent image, a Y image forming unit 20Y that forms a yellow image, an M image forming unit 20M that forms a magenta image, a C image forming unit 20C that forms a cyan image, and a K image forming unit 20K that forms a black image are arranged in a tandem manner from upstream to downstream along the rotational direction a (i.e., a process direction) of the intermediate transfer belt 42. Here, the L image forming unit 20L is adapted to form the transparent image with the clear toner.

As shown in FIG. 4, the L image forming unit 20L, the Y image forming unit 20Y, the M image forming unit 20M, the C image forming unit 20C, and the K image forming unit 20K in the image forming section 83 include, respectively, photosensitive members 22L, 22Y, 22M, 22C, and 22K; chargers 24L, 24Y, 24M, 24C, and 24K for electrically charging the surfaces of the photosensitive members 22L, 22Y, 22M, 22C, and 22K, respectively; exposing devices 26L, 26Y, 26M, 26C, and 26K for exposing the charged photosensitive members 22L, 22Y, 22M, 22C, and 22K based on the respective raster data so as to form electrostatic latent images; developing devices 28L, 28Y, 28M, 28C, and 28K for allowing a clear toner, a yellow toner, a magenta toner, a cyan toner, and a black toner to adhere onto the photosensitive members 22L, 22Y, 22M, 22C, and 22K having the electrostatic latent images formed thereon, followed by developing; and cleaners 50L, 50Y, 50M, 50C, and 50K for cleaning the surfaces of the photosensitive members 22L, 22Y, 22M, 22C, and 22K after primary transferring so as to remove residual waste toners after the transferring.

Furthermore, the image forming section 83 includes: a conveying roller 44 rotated in contact with the inner circumferential surface of the intermediate transfer belt 42 so as to allow the intermediate transfer belt 42 to travel in the direction indicated by the arrow a; a support roller 46 which tensely holds the intermediate transfer belt 42 in cooperation with the conveying roller 44 and constitutes a secondary transferring unit 6; auxiliary rollers 52 and 54 that are rotated following the rotation of the conveying roller 44 in contact with the inner circumferential surface of the intermediate transfer belt 42; a transfer roller 48L which transfers the transparent image formed by the L image forming unit 20L onto the peripheral surface of the intermediate transfer belt 42; a transfer roller 48Y which transfers the yellow image formed by the Y image forming unit 20Y onto the peripheral surface of the intermediate transfer belt 42; a transfer roller 48M which transfers the magenta image formed by the M image forming unit 20M onto the peripheral surface of the intermediate transfer belt 42; a transfer roller 48C which transfers the cyan image formed by the C image forming unit 20C onto the peripheral surface of the intermediate transfer belt 42; and a transfer roller 48K which transfers the black image formed by the K image forming unit 20K onto the peripheral surface of the intermediate transfer belt 42.

Each of the transfer rollers 48L, 48Y, 48M, 48C, and 48K is adapted to be rotated in contact with the inner circumferential surface of the intermediate transfer belt 42, so as to transfer the transparent image, the Y image, the M image, the C image, and the K image, all of which are developed, onto the intermediate transfer belt 42, and arranged along the rotational direction α of the intermediate transfer belt 42 in the order of the transfer rollers 48Y, 48M, 48C, 48L, and 48K. The transfer rollers 48L, 48Y, 48M, 48C, and 48K are connected to primary transfer bias power sources, respectively, so as to receive a predetermined voltage.

Additionally, there is provided a sheet container 70 containing therein recording sheets serving as recording media, onto which the images transferred onto the intermediate transfer belt 42 are transferred. An arrow P indicates a conveyance path for the recording sheet.

The secondary transferring unit 6 is constituted of the support roller 46 and a secondary transfer roller 62. The secondary transfer roller 62 is disposed opposite to the support roller 46 while holding the intermediate transfer belt 42 therebetween. The secondary transfer roller 62 is rotated while pressing the recording sheet onto the support roller 46 and the peripheral surface of the intermediate transfer belt 42, and then, transfers the image transferred at the peripheral surface of the intermediate transfer belt 42 onto the recording sheet. The secondary transfer roller 62 is connected to a secondary transfer bias power source, so as to receive a predetermined voltage.

A fixing device 64 is disposed downstream of the support roller 46, and includes a heating roller 66 whose temperature becomes high and a supporting roller 68. The recording sheet having the image transferred thereon in the secondary transfer unit 6 is held between the heating roller 66 and the supporting roller 68 in the fixing device 64. At this time, the toners are melted and coagulated to be then fixed onto the recording sheet. The recording sheet after the fixing is discharged onto a discharge unit 71.

Although the description has been given of the image forming section using the intermediate transfer belt, the toner images may be transferred directly onto the recording sheet, not via the intermediate transfer belt.

Next, explanation will be made on the flow of image formation in the present exemplary embodiment.

An administrator, who operates the print server 12, previously sets the validity (ON) or invalidity (OFF) of a warning function in the print server 12. The warning function is a function of determining based on clear raster data after corrected by the total amount restricting processing, described later, whether or not a transparent image intended by a user, who has transmitted image formation information, is formed, and then, when it is determined that the intended transparent image is not formed, the client apparatus 10 on the transmission source of the image formation information is notified of a warning or the display unit 33 is notified of the warning.

In the meantime, the user designates the formation of a colorful image to be formed on the side of the client apparatus 10, and then, the designation is converted into image formation information in a page description language by a printer driver or the like, to be thus transmitted to the print server 12.

Figure 5:
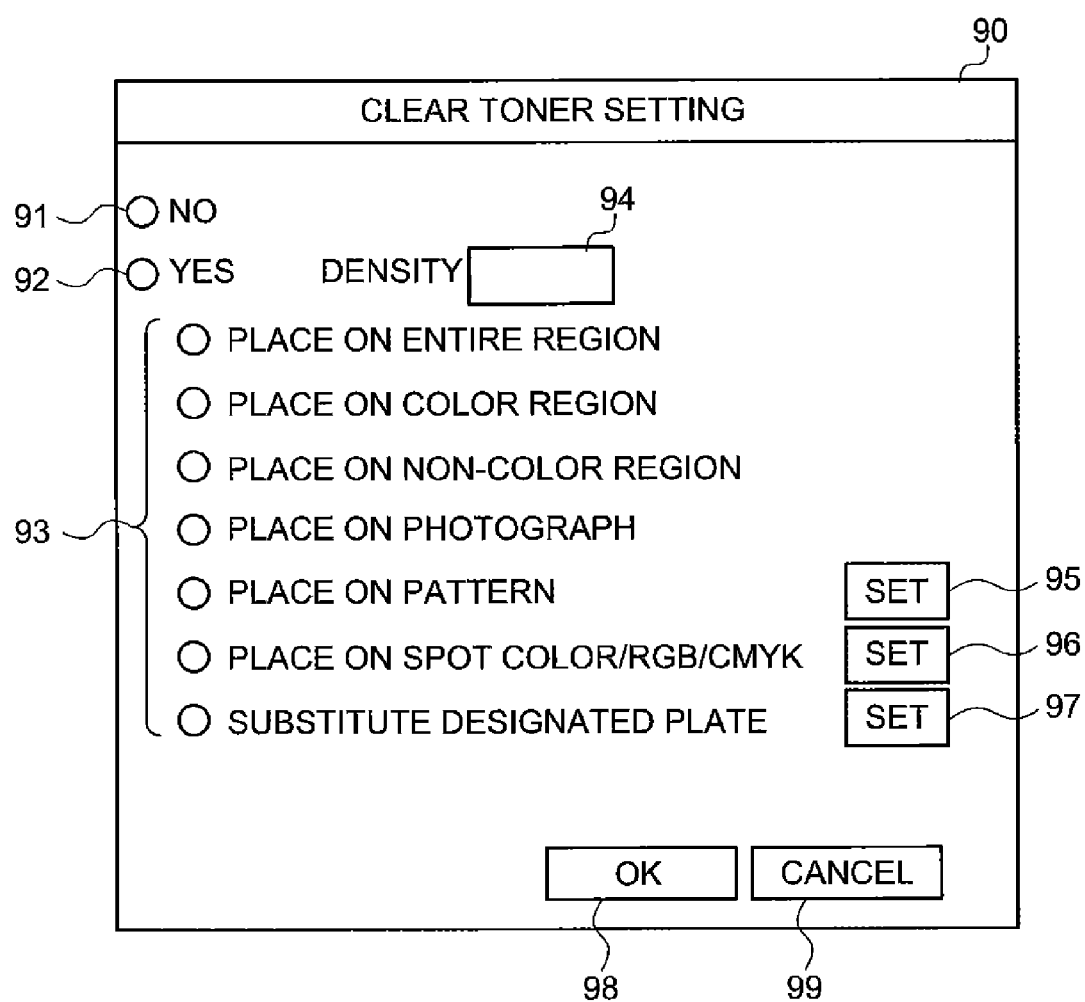
FIG. 5 is a diagram illustrating one example of a setting screen for setting the conditions of formation of a transparent image.

Formation conditions for forming the transparent image in superimposition on the image based on the received image formation information can be set in the print server 12. FIG. 5 is a diagram illustrating one example of a setting screen 90 for setting the formation conditions of the transparent image. In the case where no transparent image is superimposed on a colorful image, "No" 91 is designated. In contrast, in the case where a transparent image is superimposed on a colorful image, "Yes" 92 is designated. Moreover, when "Yes" 92 is designated (i.e., a transparent image is superimposed on a colorful image), a region in which the transparent image is superimposed is designated at 93. Here, a region in which the transparent image is superimposed (i.e., a region in which a clear toner is actually placed) is designated by designating any of the following items.

Entire Region
Color region
Non-color region
Photograph
Pattern
Spot color/RGB/CMYK
Substitute Designated Plate In the case where the transparent image is intended to be superimposed in the entire image formation region, "Entire Region" is designated. In the case where the transparent image is intended to be superimposed in a region other than a white region (i.e., a region in which any of CMYK toners are placed) in a colorful image, "Color region" is designated. In the case where the transparent image is intended to be superimposed in the white region (i.e., a region in which none of CMYK toners are placed) in a colorful image, "Non-color region" is designated. In the case where the transparent image is intended to be superimposed in a region having a photograph within a colorful image, "Photograph" is designated.

In the case where the transparent image is intended to be superimposed according to a pattern previously registered within a colorful image, "Pattern" is designated. Here, the user depresses a set button 95 corresponding to "Pattern," a list of registered patterns is displayed, and then, the pattern, according to which a transparent image is superimposed, is selected.

In the case where the transparent image is intended to be superimposed in a region in which a spot color is placed within a colorful image, "Spot color/RGB/CMYK" is designated. Incidentally, the user depresses a setting button 96 corresponding to "Spot color/RGB/CMYK" to display a designation screen for designating the name of a spot color, the value of each of RGB colors, or the value of each of CMYK colors, thereby designating the spot color by designating the name of the spot color or the value of each of the colors. For example, in the case where the red (i.e., the R color) is designated, numerical values are designated in such a manner that R is 100%, G is 0%, and B is 0%.

In the case where an image is intended to be formed by substituting image information used in forming an image of any of CMYK colors by transparent image information, "Substitute Designated Plate" is designated. In the case where the user designates "Substitute DesignatedPlate," the user depresses a setting button 97 corresponding to "Substitute Designated Plate" to display a designation screen for designating a plate of any of the CMYK colors (i.e., raster data), so as to designate any of the CMYK colors. The raster data on the designated color is substituted as the raster data on the transparent image, and thus, achieving a region in which the clear toner is placed.

In the present exemplary embodiment, in the case where the transparent image is superimposed on the colorful image, the density 94 of the transparent image to be superimposed also is designated. The density of the transparent image signifies, for example, the dot area ratio of the transparent image. Here, the density of the region in which the clear toner is actually placed is designated by selecting from 0% to 100%. Incidentally, the numerical value representing the density may be a gradation value.

When an OK button 98 is selected after the designation of the formation conditions of the transparent image, as described above, the formation conditions are stored in a predetermined storage region, and then, are set there. In contrast, when a cancel button 99 is selected after the designation of the formation conditions of the transparent image, as described above, the designation is canceled.

The printer driver in the client apparatus 10 produces image formation information including image information representing the designated colorful image, and then, transmits the information to the print server 12.

Figure 6:
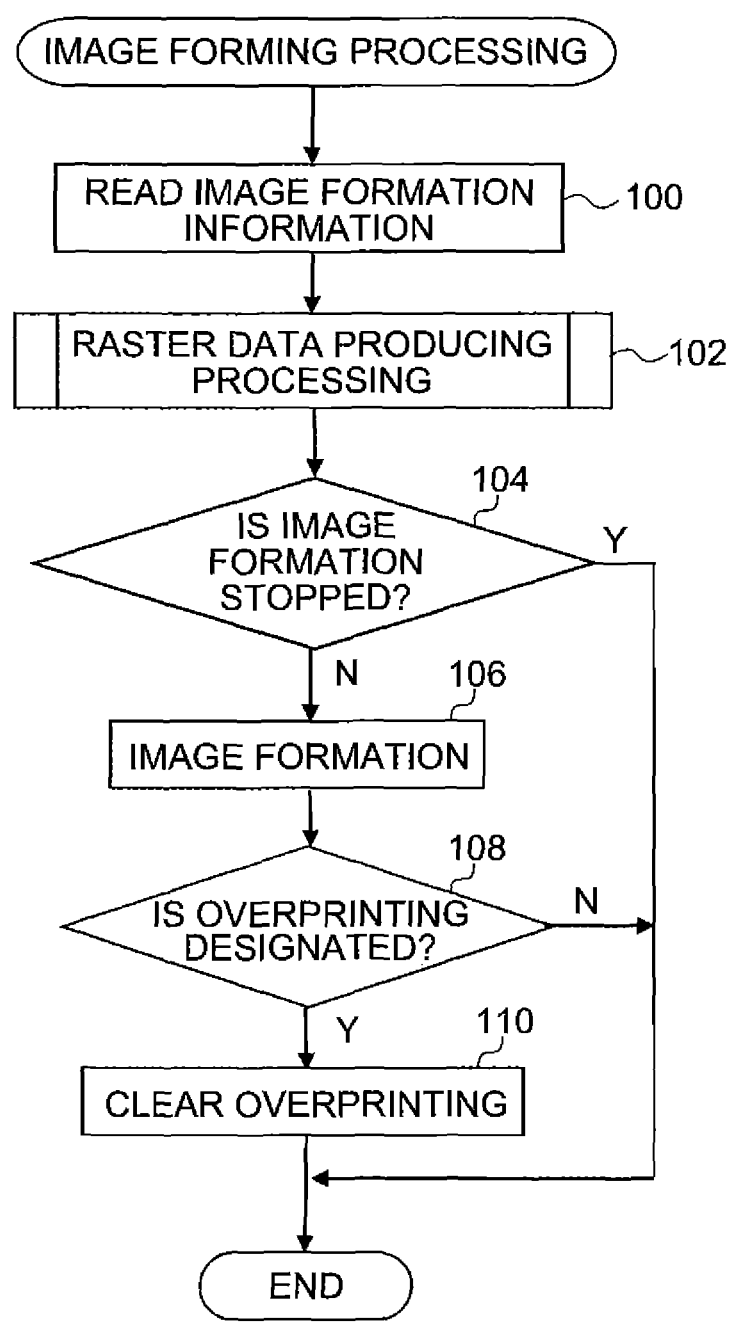
FIG. 6 is a flowchart illustrating the flow of a processing routine to be executed by the print server.

When the print server 12 receives the image formation information via the communication IF 36, the CPU 30 in the print server 12 executes a predetermined program, so that the received image formation information is stored in the RAM 32 or the HDD 35, and then, a processing routine illustrated in FIG. 6 is executed.

In step 100, the image formation information is read in.

In step 102, a sub routine for raster data producing processing is invoked.

Figure 7:
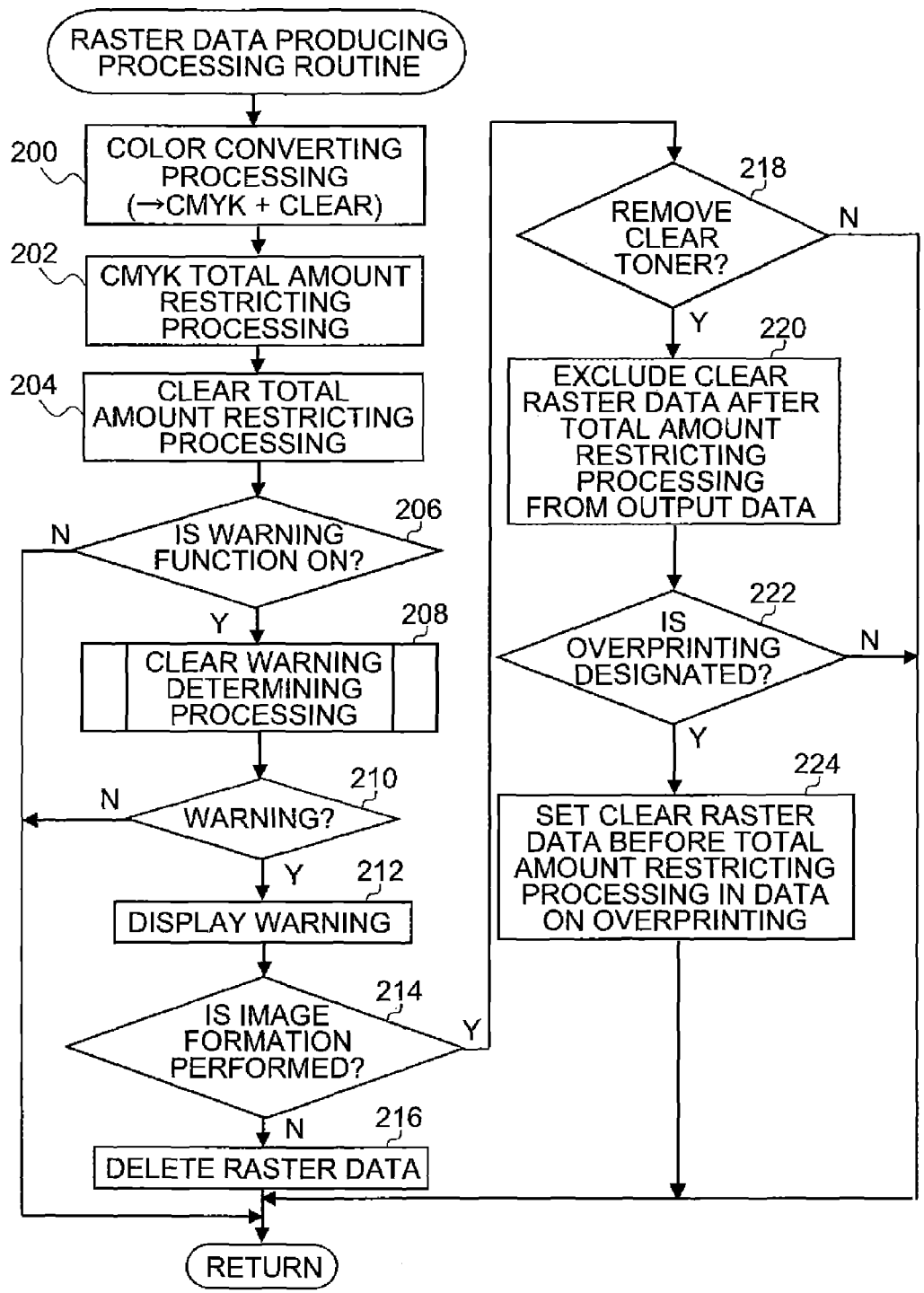
FIG. 7 is a flowchart illustrating the flow of a sub routine of raster data producing processing.

FIG. 7 is a flowchart illustrating the flow of the sub routine for the raster data producing processing.

In step 200, color conversion processing is performed. Specifically, the raster data on each of the CMYK colors and the clear raster data are produced according to the resolution of the printer 14 based on the image formation information and the formation conditions of the transparent image.

Next, in step 202, the total amount restricting processing is performed with respect to the raster data on each of the CMYK colors.

In the case where the total toner amount exceeds a predetermined threshold when an image is formed on a recording sheet in the printer 14, a toner cannot be stably fixed onto the recording sheet, and therefore, when another recording sheet is discharged in the state in which it overlaps the recording sheet discharged in this state, the toner adheres onto the other recording sheet, thereby possibly inducing troubles such as color transfer or mutual adhesion between the recording sheets. In view of these, in the present exemplary embodiment, the total amount restricting processing for correcting the raster data before the image formation is performed in order to restrict the total amount of toner adhering onto the recording sheet.

In the total amount restricting processing in step 202, the density of each of the CMYK colors is corrected in such a manner as to be reduced in the same rate such that the total density, per pixel, of the raster data on each of the CMYK colors does not exceed a first predetermined upper value (hereinafter referred to as a first total amount restriction value). In the present exemplary embodiment, the first total amount restriction value with respect to the total density of the four CMYK colors is set to 235% (see also FIG. 9).

Figure 8:
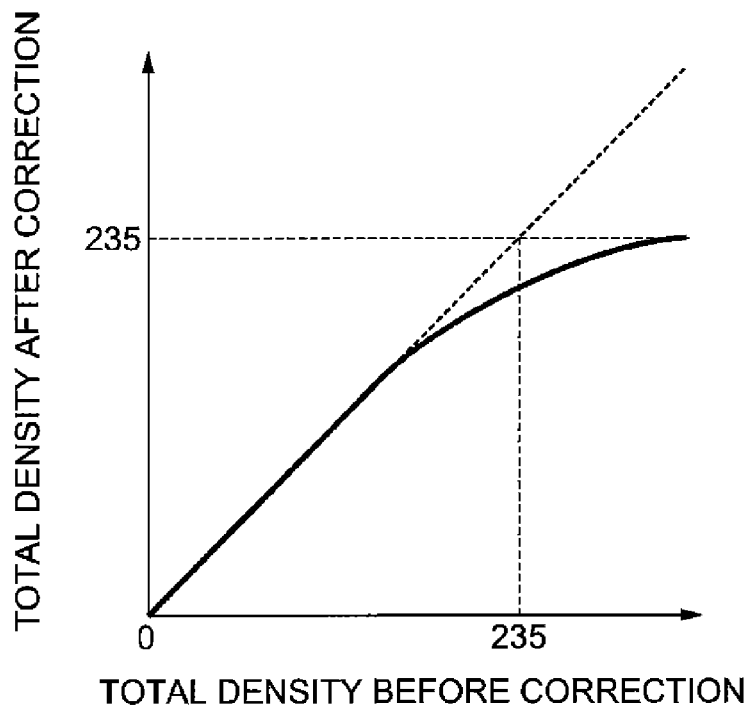
FIG. 8 is a graph illustrating total amount restricting processing for inks of four colors CMYK.

In the present exemplary embodiment, the first total amount restriction value is used as a boundary, and further, not only a pixel whose total density of the four CMYK colors exceeds the first total amount restriction value is corrected, but also when the total density of the four CMYK colors is a predetermined value or higher, as illustrated in FIG. 8, the density of the pixel of each of the CMYK colors is reduced to be corrected with respect to a pixel having the first total amount restriction value or lower, thereby preventing any abrupt change in hue. A pixel whose total density of the four CMYK colors is lower than the predetermined value is not corrected.

Upon completion of the total amount restricting processing of the density of each of the CMYK colors, the total amount restricting processing of the clear raster data is performed in next step 204. Here, in the case where the total value of each of the densities of the raster data on the CMYK colors after the total amount restricting processing in step 202 and the value of the density of the clear raster data (hereinafter referred to as a total value α) per pixel exceed a second predetermined upper value (hereinafter referred to as a second total amount restriction value), the density of the clear raster data is corrected (i.e., reduced) in such a manner that the total value α does not exceed the second total amount restriction value. In the present exemplary embodiment, the second total amount restriction value is set to 255% with respect to the total value α. Since the first total amount restriction value is 235%, the corrected density of the clear raster data becomes 20% or more at the minimum in the region designated as the region in which the clear toner is placed when the density of the clear raster data is 20% or more.

Incidentally, the total amount restricting processing of the clear raster data is different from that of the CMYK raster data. The clear toner amount in excess of the boundary is reduced by using the second total amount restriction value as the boundary. Here, in the case where the total value α does not exceed the second total amount restriction value, the density of the clear toner is not corrected.

Figure 9:
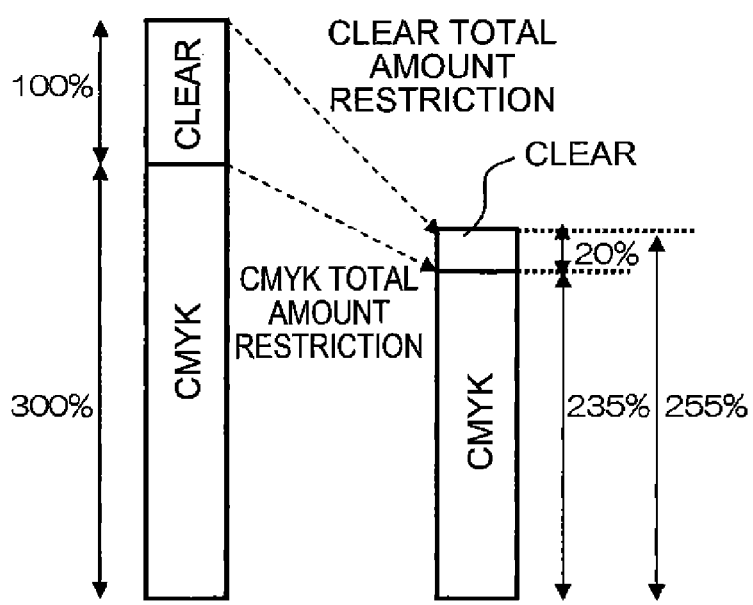
FIG. 9 is a diagram conceptually illustrating one example of the total amount restricting processing.

FIG. 9 is a diagram conceptually illustrating one example of the total amount restricting processing performed in steps 202 and 204. As illustrated in FIG. 9, in the case where the total value of the densities of the CMYK color toners before correction is 300% and the density of the clear toner is 100%, when the total value of the densities of the CMYK color toners is corrected to 235% by the total amount restricting processing in step 202, the density of the clear toner is corrected to 20% by reducing (235+100)−255=80%.

The total density of the CMYK and clear toners for each pixel of an image to be formed within an image formation region becomes 255% or less by the processing in steps 202 and 204.

As for each of the pieces of raster data, not only the raster data after the total amount restricting processing but also the raster data before the total amount restricting processing are not erased but stored in the HDD 35 or the like. Each of the pieces of raster data after the total amount restricting processing is set as output data to be output to the printer 14.

Figure 10:
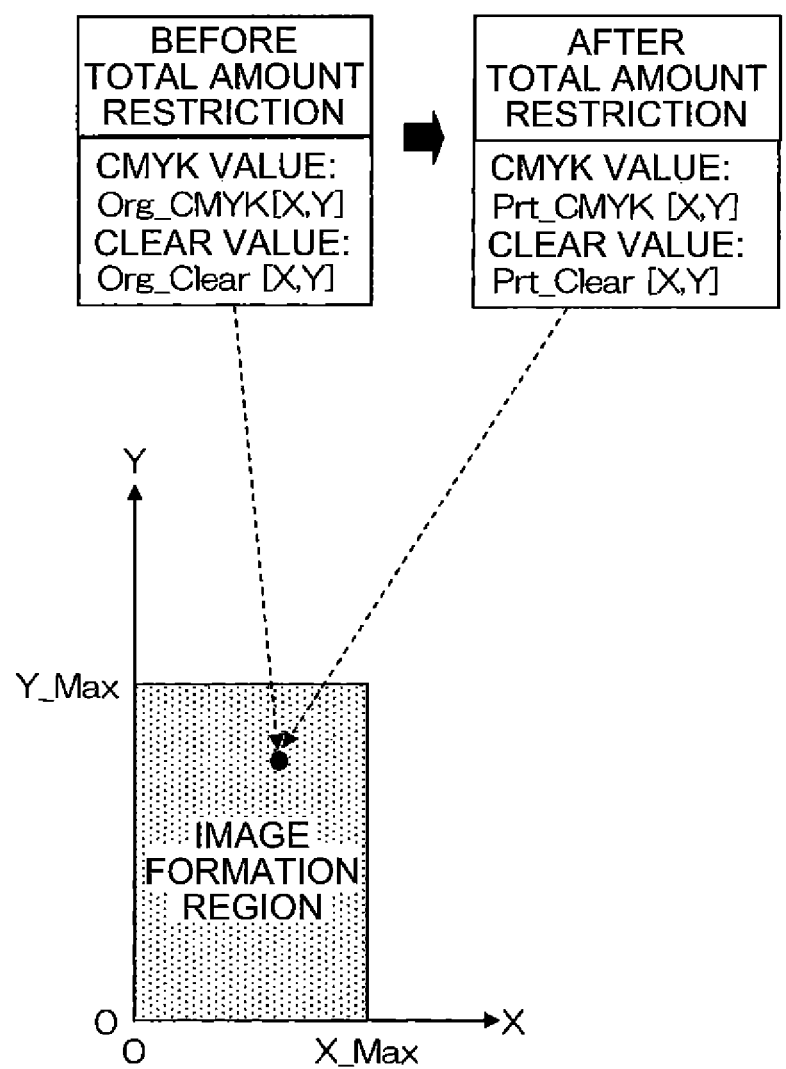
FIG. 10 is a graph illustrating the total amount restricting processing which is performed with respect to a pixel inside of an image forming region.

As illustrated in FIG. 10, each of the densities of the CMYK color toners (OrgCMYK[X,Y]) before the total amount restricting processing, each of the densities of the CMYK color toners (PrtCMYK[X,Y]) after the total amount restricting processing, the density OrgClear[X,Y] of the clear toner before the total amount restricting processing, and the density PrtClear[X,Y] of the clear toner after the total amount restricting processing are stored for each of the pixels located in the coordinates within the image formation region.

The first and second total amount restriction values may be previously set and stored in each of the printers 14, or a user may set the values at every image formation so as to transmit to the print server 12 together with the image formation information.

It is determined in step 206 whether or not the warning function is ON. When it is determined that the warning function is OFF in step 206, the sub routine is ended, and then, the control returns to the main routine illustrated in FIG. 6. In contrast, when it is determined in step 206 that the warning function is ON, a clear warning determination processing is performed in step 208.

Figure 11:
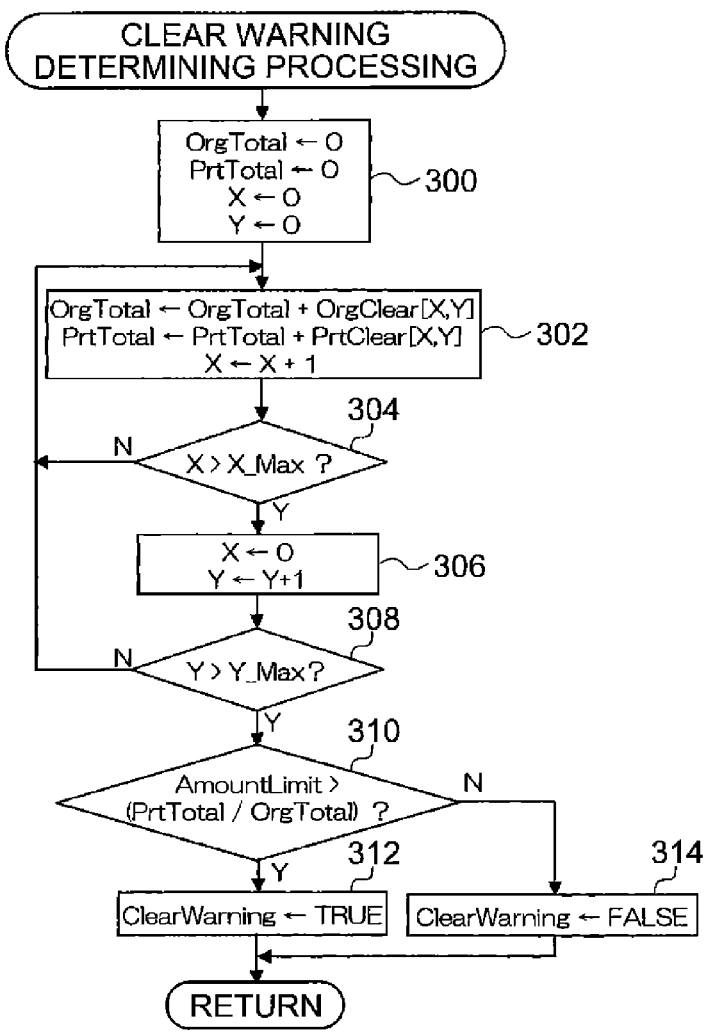
FIG. 11 is a flowchart illustrating the flow of a sub routine of clear warning determining processing.

FIG. 11 is a flowchart illustrating the flow of the sub routine of the clear warning determining processing.

Each of OrgTotal, PrtTotal, X, and Y is set to 0 in step 300. Here, OrgTotal is a variable for accumulating the densities of each of the pixels represented by the clear raster data before the total amount restricting processing; PrtTotal is a variable for accumulating the densities of each of the pixels represented by the clear raster data after the total amount restricting processing; and X and Y represent the coordinates of each of the pixels in the image formation region.

In step 302, the density OrgClear[X,Y] of the clear toner before the total amount restricting processing of the pixel located in the coordinates (X,Y) is added to OrgTotal, to be set to OrgTotal. In addition, the density PrtClear[X,Y] of the clear toner after the total amount restricting processing of the pixel located in the coordinates (X,Y) is added to PrtTotal, to be set to PrtTotal. Moreover, 1 is added to X.

It is determined in step 304 whether or not X exceeds a maximum value X_MAX. When it is determined that X does not exceed the maximum value X_MAX, the control returns to step 302, and then, the above-described processing is repeated. In contrast, when it is determined in step 304 that X exceeds the maximum value X_MAX, X is set to 0 in step 306, and then, 1 is added to Y. The control proceeds to step 308, in which it is determined whether or not Y exceeds a maximum value Y_MAX. When it is determined in step 308 that Y does not exceed the maximum value Y_MAX, the control returns to step 302, and then, the above-described processing is repeated. In contrast, when it is determined in step 308 that Y exceeds the maximum value Y_MAX, the control proceeds to step 310.

In other words, the total density of each of the pixels of the clear raster data before the total amount restricting processing and the total density of each of the pixels of the clear raster data after the total amount restricting processing are obtained by the processing from step 302 to step 308.

The ratio (PrtTotal/OrgTOtal) of the total density of each of the pixels of the clear raster data after the total amount restricting processing with respect to the total density of each of the pixels of the clear raster data before the total amount restricting processing is calculated in step 310. Thereafter, it is determined whether or not the calculated ratio is smaller than a predetermined threshold AmountLimit.

When the determination in step 310 is affirmative, it is determined that a transparent image intended by a user is not formed. And then, TRUE is set in a flag ClearWarning indicating a warning in step 312. The control returns from this sub routine to the sub routine illustrated in FIG. 7. In contrast, when the determination in step 310 is negative, it is determined that a transparent image intended by a user is formed. And then, FALSE is set in the flag ClearWarning indicating the warning in step 314. The control returns from this sub routine to the sub routine illustrated in FIG. 7.

Thereafter, it is determined with reference to the flag ClearWarning indicating the warning in step 210 in FIG. 7 whether or not there is a warning. Here, when the flag ClearWarning indicating the warning is TRUE, it is determined that there is a warning. In contrast, when the flag ClearWarning indicating the warning is FALSE, it is determined that there is no warning.

When it is determined in step 210 that there is a warning, the warning screen is displayed on the display unit 33 in the print server 12 in step 212.

Figure 12:
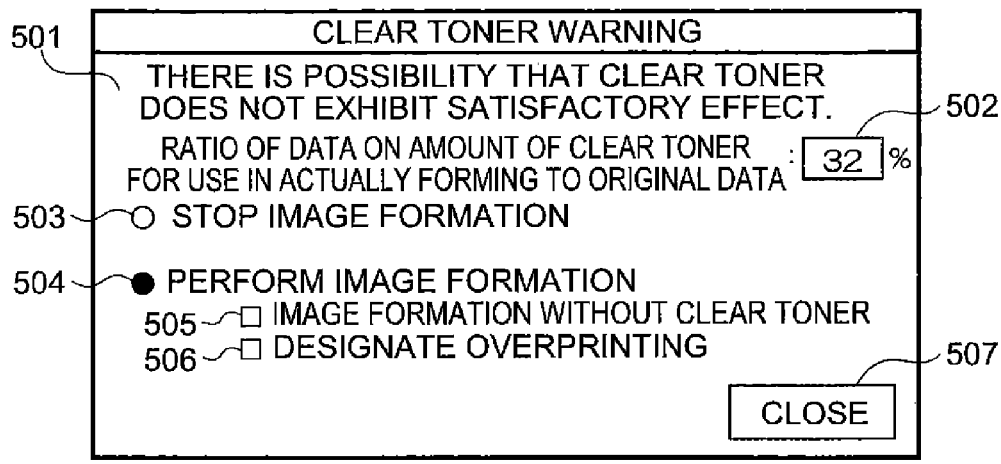
FIG. 12 is a diagram illustrating one example of a warning screen.

FIG. 12 is a diagram illustrating one example of the warning screen. Reference numeral 501 designates a message indicating that a transparent image intended by the user is not formed. Moreover, reference numeral 502 denotes a value PrtTotal/OrgTOtal compared with the threshold in step 310.

The user designates with reference to the warnings 501 and 502 whether the image formation is stopped or executed by using the operating unit 34. When the stoppage of the image formation is designated, "stop image formation" denoted by reference numeral 503 is selected on the warning screen. In contrast, when the execution of the image formation is designated, "execute image formation" denoted by reference numeral 504 is selected on the warning screen.

When the user selects "execute image formation" denoted by reference numeral 504, it is further determined whether only a CMYK colorful image is formed without forming any transparent image or a transparent image is formed in superimposition on a colorful image. In the case where only the CMYK colorful image is formed without forming any transparent image, the user designates "image formation except clear toner" denoted by reference numeral 505. In contrast, when a transparent image is formed in superimposition on a colorful image, the user does not designate "image formation except clear toner" denoted by reference numeral 505.

In the case where "image formation except clear toner" denoted by reference numeral 505 is designated, it is further determined whether or not overprinting is performed. Here, the overprinting signifies formation of the transparent image in superimposition by, for example, taking the recording sheet after the image formation from the discharge unit 71 in the image forming section 83 and setting the recording sheet in the sheet container 70 again. In the case where the overprinting is performed, "designate overprinting" denoted by reference numeral 506 is selected. In contrast, in the case where the overprinting is not performed, "designate overprinting" denoted by reference numeral 506 is not selected. In the case of the overprinting, the clear raster data before the total amount restricting processing is used.

When the user ends the designation to select a closure button 507, the designation information indicating the contents designated by 503 to 506 is stored in the HDD 35 of the print server 12.

Upon completion of the designation of the designation information, the print server 12 determines based on the designation information in step 214 in FIG. 7 whether or not the image formation is executed. When the determination in step 214 is negative, the above-produced raster data before and after the total amount restricting processing are deleted in step 216, and then, the control returns from this sub routine to the main processing routine illustrated in FIG. 6.

In contrast, when the determination in step 214 is affirmative, the control proceeds to step 218. Referring to the received designation information in step 218, it is determined whether or not the clear toner is removed, that is, the transparent image is not superimposed on the colorful image. When the determination is affirmative in step 218, the clear raster data after the total amount restricting processing is deleted from the above-described output data in step 220.

When the determination is negative in step 218, the user wants to form the transparent image in superimposition on the colorful image by using each of the raster data after the total amount restricting processing, and therefore, the control returns from the sub routine to the main processing routine illustrated in FIG. 6 while the output data is kept to be set.

After step 220, it is determined in step 222 whether or not the overprinting is designated. When the determination is affirmative in step 222, the clear raster data before the total amount restricting processing is set as data for the overprinting in step 224, and then, the control returns from the sub routine to the main processing routine illustrated in FIG. 6. In contrast, when the determination is negative in step 222, the control returns from the sub routine to the main processing routine illustrated in FIG. 6 as it is.

Thereafter, it is determined in step 104 illustrated in FIG. 6 whether or not the image formation is stopped. At this time, after the affirmative determination in step 210 illustrated in FIG. 7, it is determined whether or not the image is formed based on the information designated by the user. When the determination in step 210 is negative, the negative determination is made in step 104.

When the determination in step 104 is affirmative, the processing routine is ended without outputting the raster data to the printer 14. Therefore, the image formation is not performed. In contrast, when the determination in step 104 is negative, the raster data set as the output data is output to the printer 14 in step 106, and then, an image is formed by the printer 14.

Next, it is determined in step 108 whether or not the overprinting is designated. After the affirmative determination in step 210 illustrated in FIG. 7, it is determined based on the information designated by the user whether or not the overprinting is designated. In the case of the negative determination in step 210, the negative determination is made in step 108.

In the case of the affirmative determination in step 108, the raster data set as the data for the overprinting is output to the printer 14 in step 110, and then, the overprinting is performed. In contrast, in the case of the negative determination in step 108, the control skips step 110, and then, the processing routine is ended.

Although it is determined whether or not PrtTotal/OrgTotal is smaller than the predetermined threshold AmountLimit in FIG. 11, it may be determined whether or not OrgTotal/PrtTotal is larger than a predetermined threshold AmountLimit_2.

Figure 13:
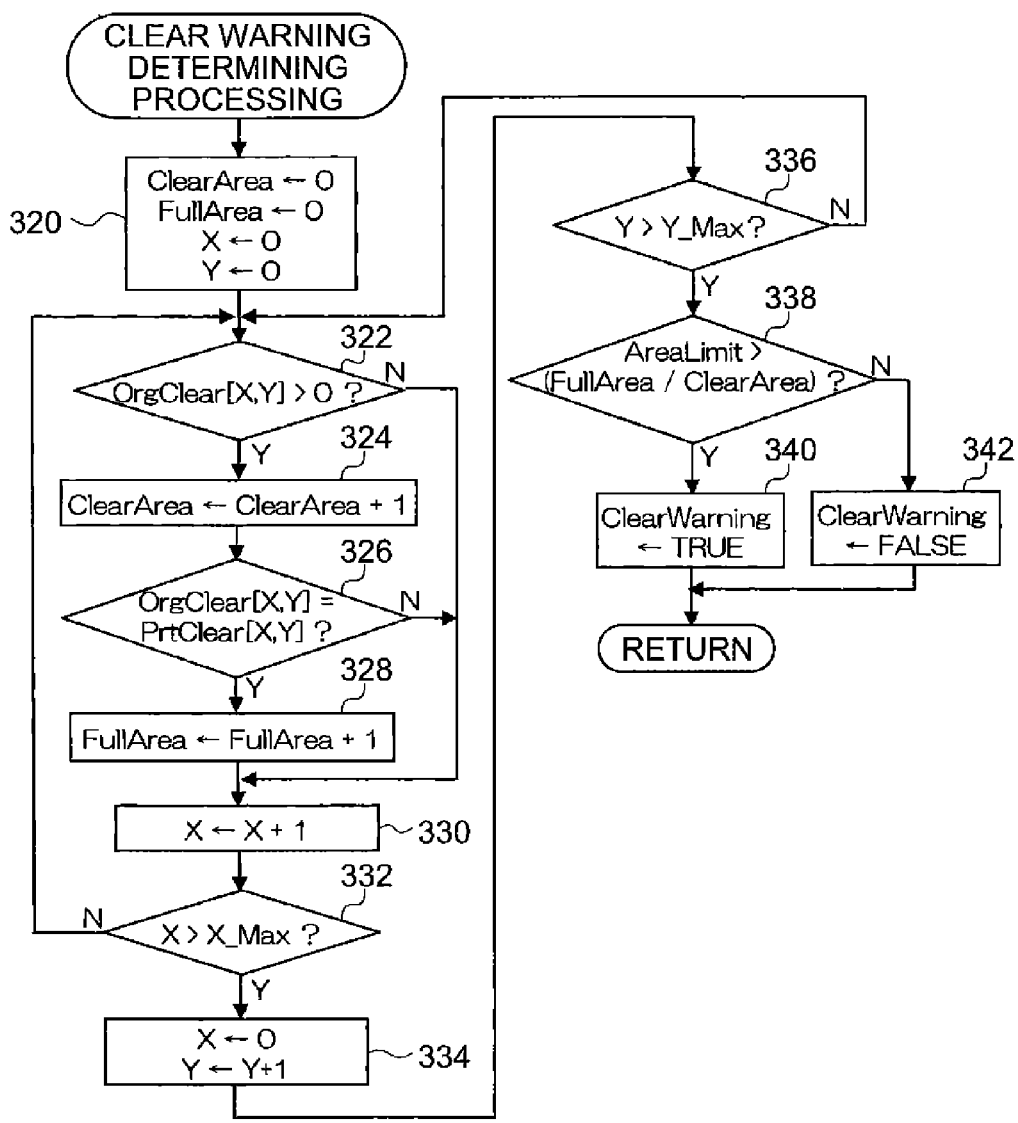
FIG. 13 is a flowchart illustrating the flow of a sub routine of the clear warning determining processing.

Alternatively, a sub routine illustrated in FIG. 13 may be executed in place of the sub routine of the clear warning determining processing illustrated in FIG. 11.

In step 320, the variables (ClearArea, FullArea, X, and Y) are set to 0.

It is determined in step 322 whether or not the density OrgClear[X,Y] of the clear toner before the total amount restricting processing of the pixel located in the coordinates (X,Y) is larger than 0. When the determination is affirmative in step 322, 1 is added to ClearArea in step 324.

It is determined in step 326 whether or not the density OrgClear[X,Y] of the clear toner before the total amount restricting processing of the pixel located in the coordinates (X,Y) is equal to the density PrtClear[X,Y] of the clear toner after the total amount restricting processing of the pixel located in the coordinates (X,Y). When the determination is affirmative in step 326, 1 is added to FullArea in step 328.

When the determination is negative in step 322 and the processing in step 328 is ended, the control proceeds to step 330. In step 330, 1 is added to X.

It is determined in step 332 whether or not X exceeds the maximum X_MAX. When the determination is negative, the control returns to the processing in step 322, and then, the above-described processing is repeated. In contrast, when it is determined in step 332 that X exceeds the maximum X_MAX, 0 is set to X in step 334 whereas 1 is added to Y. And then, the control proceeds to step 336, in which it is determined whether or not Y exceeds the maximum Y_MAX. When it is determined in step 336 that Y does not exceed the maximum Y_MAX, the control returns to step 332, and then, the above-described processing is repeated. In contrast, when it is determined in step 336 that Y exceeds the maximum Y_MAX, the control proceeds to step 338.

In other words, the number (ClearArea) of pixels in the region of the transparent image formed based on the clear raster data before the total amount restricting processing (i.e., the region in which the density of the clear toner is larger than 0) and the number (FullArea) of pixels whose density is not corrected by the total amount restricting processing in the region of the transparent image formed based on the clear raster data before the total amount restricting processing (i.e., the region in which the density of the clear toner is larger than 0) are accumulated in the processing from step 322 to step 336. In the present exemplary embodiment, the number of pixels is obtained as an area.

In step 338, it is determined whether or not FullArea/ClearArea is smaller than a predetermined threshold AreaLimit.

In the case of the affirmative determination in step 338, it is determined that the transparent image intended by the user is not formed. TRUE is set in a flag ClearWarning indicating a warning is set in step 340, and then, the control is returned to the sub routine illustrated in FIG. 7 from this sub routine. In contrast, in the case of the negative determination in step 338, it is determined that the transparent image intended by the user is formed. FALSE is set in the flag ClearWarning indicating a warning is set in step 342, and then, the control is returned to the sub routine illustrated in FIG. 7 from this sub routine.

Although it is determined in step 338 illustrated in FIG. 13 whether or not FullArea/ClearArea is smaller than the predetermined threshold AreaLimit, it may be determined whether or not ClearArea/FullArea is larger than the predetermined threshold AreaLimit_2.

Moreover, although the determination uses the result obtained by counting the number of pixels whose density is not corrected by the total amount restricting processing in FIG. 13, it is not limited to this. For example, the determination may use a result obtained by counting the number of pixels in a region in which the density corrected by the total amount restricting processing becomes smaller than that before the correction.

Specifically, a variable DecArea, for example, may be used in place of the variable FullArea. In the case of the negative determination in step 326, DecArea is counted up. In contrast, in the case of the affirmative determination in step 326, the processing in step 328 is not performed. It is determined in step 338 whether or not DecArea/ClearArea is larger than a predetermined threshold AreaLimit_3.

Additionally, although the description has been given of the present exemplary embodiment in which the density of the clear toner cannot become less than 20% even by the total amount restricting processing in the region designated as being the region in which the clear toner is placed, there may be no such setting, that is, the density may be 0% by the total amount restricting processing. In this case, the determination may use a result obtained by counting the number of pixels whose density becomes 0% by the total amount restricting processing, even though the density exceeds 0% before the total amount restricting processing.

Specifically, a variable ZeroArea, for example, is used in place of the variable FullArea illustrated in FIG. 13, and further, the processing of determining whether or not PrtClear [X,Y] is equal to 0 is performed in place of the processing in step 326. In the case of the affirmative determination herein, ZeroArea is counted up in place of the processing in step 328. Moreover, it is determined in step 338 whether or not ZeroArea/ClearArea is larger than a predetermined threshold AreaLimit_4.

Figure 14:
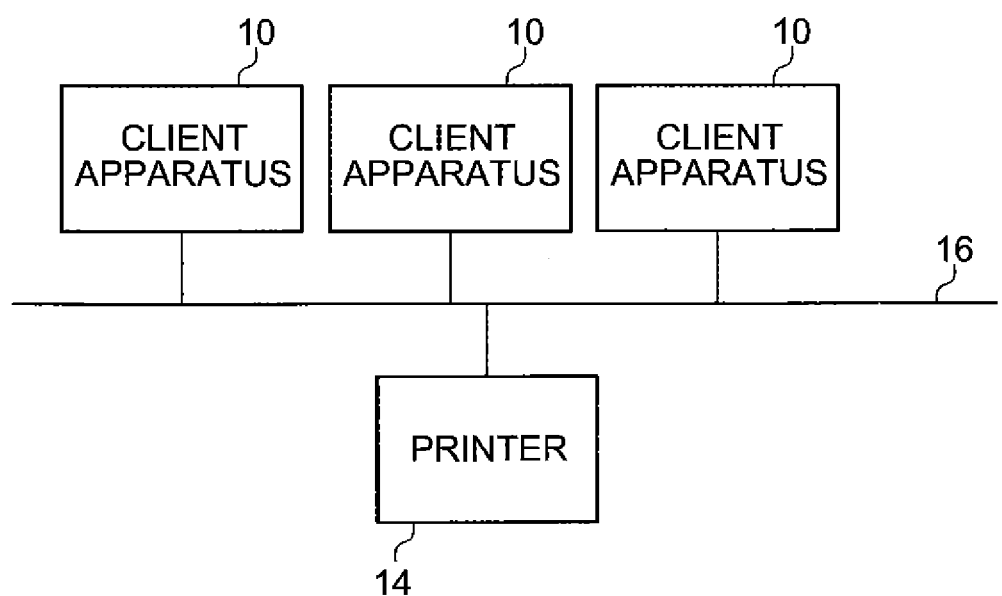
FIG. 14 is a diagram illustrating an example of connection between the printer and the client apparatuses.

Although the description has been given of the example in which the print server 12 executes the processing routine or the like in the above-described exemplary embodiment, it is not limited to this. For example, no print server 12 is provided whereas the printer 14 is connected to the communication component 16 to be communicable with each of the client apparatuses 10, as illustrated in FIG. 14. The printer 14 may be equipped with the function of the print server 12, and further, the CPU 80 in the printer 14 may execute the programs of the above-described processing routine (wherein the programs may be stored in the ROM 81), so that the above-described processing routine may be executed.

Figure 15:
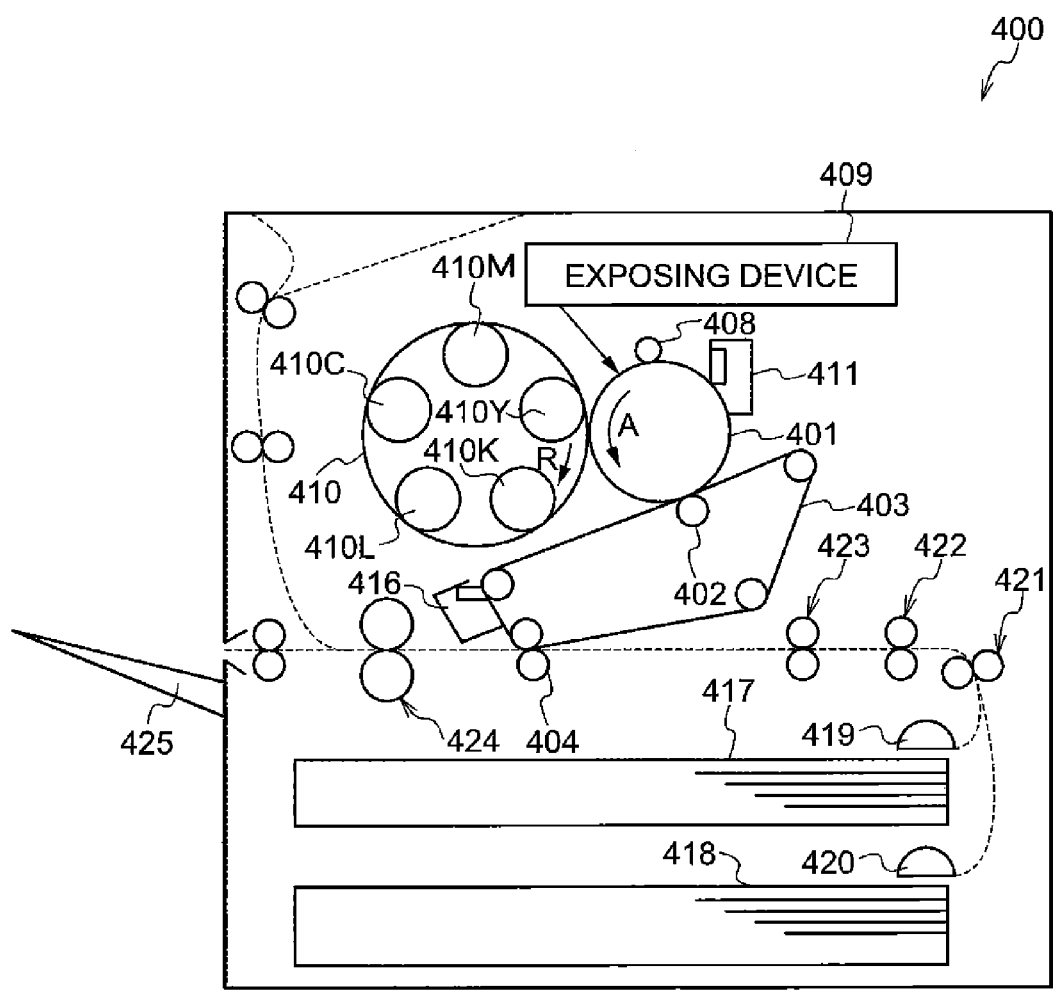
FIG. 15 is a view schematically showing the configuration of the image forming section, in which a rotary developing device is installed.

Moreover, the image forming section 83 is not limited to the above-described configuration of the tandem system. As shown in FIG. 15, an image forming section 400 including a rotary developing device 410 may be used, for example.

A photosensitive member 401 is rotated in a direction indicated by an arrow A by a motor. Around the photosensitive member 401, there are arranged a charging roll 408, an exposing device 409, the developing unit 410, a primary transferring unit 402, and a cleaning device 411.

The charging roll 408 is adapted to electrically charge the surface of the photosensitive member 401. The exposing device 409 is designed to expose the charged surface of the photosensitive member 401 with a laser beam according to image data, thereby forming an electrostatic latent image.

The developing unit 410 provided with developing devices 410Y, 410M, 410C, and 410K which use toners of Y, M, C, and K colors, and a developing device 410L which uses a clear toner, arranged in a circumferential direction of the developing unit 410. The developing devices 410Y, 410M, 410C, 410K, and 410L develop the electrostatic latent image formed on the photosensitive member 401 with the Y, M, C, and K toners and the clear toner. In developing, the developing unit 410 is rotated in a direction indicated by an arrow R by the motor, and it is positioned in such a manner that the developing device concerned faces the electrostatic latent image formed on the photosensitive member 401.

The respective toner images developed on the photosensitive member 401 are transferred in sequence onto an intermediate transfer belt 403 by the primary transferring device 402, to be then superimposed one on another. A belt cleaner 416 is disposed in the intermediate transfer belt 403, and thus, the toners remaining on the intermediate transfer belt 403 are scraped off by a cleaning blade.

A recording sheet drawn onto a transportation path by a drawing roll 419 or 420 from a recording sheet cassette 417 or 418 is transported to a transfer position in a secondary transferring device 404 by roll pairs 421, 422, and 423. The toner images formed on the intermediate transfer belt 403 are transferred onto the recording sheet at the transfer position, to be then thermally fixed by a fixing device 424, and thus, is discharged onto a discharging device 425 or the top of a main apparatus.

The above-described image forming apparatus 400 also may be used as an image forming apparatus for forming a transparent image onto a synthetic image, as described in the above-described exemplary embodiment.

Although the software executes the processing for controlling the image formation according to the determination resulting from the raster data producing processing, the clear warning determining processing, and the clear warning determining processing in the above-described exemplary embodiment, hardware may execute the processing.

What is claimed is:

1. An image processing apparatus comprising:
   a processor; and
   a memory storing instructions, which when executed by the processor, cause the processor to perform as
      a color material total amount determination component that determines whether or not a total amount of a plurality of color materials is larger than a predetermined first amount when an image is formed using the plurality of color materials;
      a density conversion component that converts a density of a transparent color material so that the total amount of the plurality of color materials is smaller than the predetermined first amount when it is determined that the total amount of the plurality of color materials is larger than the predetermined first amount and when the transparent color material is included in the plurality of color materials;
      a density ratio calculation component that calculates a ratio between a density before the density conversion component converts the density of the transparent color material and a density after the density conversion component converts the density of the transparent material;
      a density ratio determination component that determines whether or not the ratio of the density calculated by the density ratio calculating component is smaller than a predetermined second amount; and
      a reporting component that reports that the ratio of the density is smaller than the predetermined second amount when the density ratio determination component determines that the ratio of the density calculated by the density ratio calculating component is smaller than the predetermined second amount.

2. The image processing apparatus of claim 1, wherein the density ratio calculation component calculates any one of:
   a value that represents a ratio between a total amount of density values of respective pixels of image data of the transparent color material before conversion by the density component, and a total amount of density values of respective pixels of the image data of the transparent color material after conversion by the density conversion component,
   a value that represents a ratio between an area of the image data of the transparent color material before conversion by the density conversion component and an area of a region that has not been converted by the density conversion component; or
   a value that represents a ratio between an area of the image data of the transparent color material before conversion by the density conversion components and an area of a region in which a density value is smaller than a density value before conversion or a region in which a density value is 0% after conversion by the density conversion component.

3. The image processing apparatus of claim 1, wherein the reporting component reports when the amount of the transparent color material is smaller than the predetermined second amount, and does not report when the amount of the transparent color material is larger than the predetermined second amount.

4. An image forming apparatus comprising:
a processor; and
a memory storing instructions, which when executed by the processor, cause the processor to perform as
- a color material total amount determination component that determines whether or not a total amount of a plurality of color materials is larger than a predetermined first amount when an image is formed using the plurality of color materials;
- a density conversion component that converts a density of a transparent color material so that the total amount of the plurality of color materials is smaller than the predetermined first amount when it is determined that the total amount of the plurality of color materials is larger than the predetermined first amount and when the transparent color material is included in the plurality of color materials;
- a density ratio calculation component that calculates a ratio between a density before the density conversion component converts the density of the transparent color material and a density after the density conversion component converts the density of the transparent material;
- a density ratio determination component that determines whether or not the ratio of the density calculated by the density ratio calculating component is smaller than a predetermined second amount;
- a reporting component that provides a warning when the density ratio determination component determines that the ratio of the density calculated by the density ratio calculating component is smaller than the predetermined second amount; and a selection component that allows a user to select whether or not image forming is to be carried out when the report component provides the warning.

5. The image forming apparatus of claim 4, wherein the reporting component reports when the amount of the transparent color material is smaller than the predetermined second amount, and does not report when the amount of the transparent color material is larger than the predetermined second amount.

6. A non-transitory storage medium readable by a computer that includes at least one processor that is programmed to execute a program of instructions, the storage medium storing the program to function as components, the components comprising:
- a color material total amount determination component that determines whether or not a total amount of a plurality of color materials is larger than a predetermined first amount when an image is formed using the plurality of color materials;
- a density conversion component that converts a density of a transparent color material so that the total amount of the plurality of color materials is smaller than the predetermined first amount when it is determined that the total amount of the plurality of color materials is larger than the predetermined first amount and when the transparent color material is included in the plurality of color materials;
- a density ratio calculation component that calculates a ratio between a density before the density conversion component converts the density of the transparent color material and a density after the density conversion component converts the density of the transparent material;
- a density ratio determination component that determines whether or not the ratio of the density calculated by the density ratio calculating component is smaller than a predetermined second amount; and
- a reporting component that reports that the ratio of the density is smaller than the predetermined second amount when the density ratio determination component determines that the ratio of the density calculated by the density ratio calculating component is smaller than the predetermined second amount.

7. The non-transitory storage medium of claim 6, wherein the program further causes the computer functioning as the reporting component to report when the amount of the transparent color material is smaller than the predetermined second amount, and does not report when the amount of the transparent color material is larger than the predetermined second amount.

* * * * *